(12) United States Patent
Steven

(10) Patent No.: US 9,970,172 B2
(45) Date of Patent: May 15, 2018

(54) APPARATUS FOR PROVIDING ACCESS TO EQUIPMENT OR STRUCTURES THAT REQUIRE MAINTENANCE

(71) Applicant: Celtic Design Consultants Limited, Glasgow (GB)

(72) Inventor: Iain Steven, Bridge of Weir (GB)

(73) Assignee: CELTIC DESIGN CONSULTANTS LTD, Glasgow (GB)

( * ) Notice: Subject to any disclaimer, the term of this patent is extended or adjusted under 35 U.S.C. 154(b) by 0 days. days.

(21) Appl. No.: 15/323,474

(22) PCT Filed: Jul. 1, 2015

(86) PCT No.: PCT/GB2015/051925
§ 371 (c)(1),
(2) Date: Jan. 3, 2017

(87) PCT Pub. No.: WO2016/001666
PCT Pub. Date: Jan. 7, 2016

(65) Prior Publication Data
US 2017/0138009 A1  May 18, 2017

(30) Foreign Application Priority Data
Jul. 4, 2014  (GB) .................................. 1411972.1

(51) Int. Cl.
*E02B 17/00* (2006.01)
*E21B 15/02* (2006.01)
(Continued)

(52) U.S. Cl.
CPC .......... *E02B 17/0034* (2013.01); *B66C 23/52* (2013.01); *B66F 11/04* (2013.01);
(Continued)

(58) Field of Classification Search
CPC ........ E02B 17/00; E02B 17/02; E02B 17/021; E21B 15/003
(Continued)

(56) References Cited

U.S. PATENT DOCUMENTS 3,817,199 A    6/1974  Schirtzinger
4,401,398 A *  8/1983  Remson .................. E21B 7/136
                                                    166/367
(Continued)

FOREIGN PATENT DOCUMENTS

EP    2463224 A1   6/2012
NL     93492 C    2/1960
(Continued)

OTHER PUBLICATIONS

Written Opinion, PCT/GB2015/051925, dated Oct. 15, 2015.
International Search Report, PCT/GB2015/051925, dated Oct. 15, 2015.

*Primary Examiner* — Frederick L Lagman
(74) *Attorney, Agent, or Firm* — Colby Nipper PLLC

(57) ABSTRACT

The present invention relates to an apparatus for providing access to equipment or structures that require maintenance. More particularly, the present invention is suitable to provide access to equipment or structures located offshore, such as wind turbines or structures for oil and gas production. The apparatus comprises a deck, an apparatus structure for supporting the deck, a platform and a platform support mechanism. The platform is movable with respect to the deck from a stowed position to an extended position. In the extended position the platform forms an extension to the deck. The platform support mechanism comprises at least one cable and at least one compression post. The/each cable has a cable first end attached to the platform at or adjacent to a platform leading edge and a cable second end attached to the platform at or adjacent to a platform trailing edge.

(Continued)

The/each compression post supports the cable between the cable first end and the cable second end and is adapted to maintain a substantially constant tension in one of said cables as the platform moves from the stowed position to the extended position.

18 Claims, 7 Drawing Sheets

(51) Int. Cl.
  *B66C 23/52* (2006.01)
  *E02B 17/02* (2006.01)
  *B66F 11/04* (2006.01)
  *E21B 15/00* (2006.01)
  *B63B 9/00* (2006.01)
  *F03D 80/50* (2016.01)

(52) U.S. Cl.
  CPC .............. *E02B 17/021* (2013.01); *B63B 9/00* (2013.01); *B63B 2009/008* (2013.01); *E02B 2017/0056* (2013.01); *E02B 2017/0091* (2013.01); *E21B 15/003* (2013.01); *F03D 80/50* (2016.05); *Y02P 70/523* (2015.11)

(58) Field of Classification Search
  USPC ......................................................... 405/201
  See application file for complete search history.

(56) References Cited

U.S. PATENT DOCUMENTS

| | | | |
|---|---|---|---|
| 5,037,241 A * | 8/1991 | Vaughn ................. | B63B 35/003 405/203 |
| 6,729,804 B1 * | 5/2004 | Roodenburg ........... | B63B 35/44 175/5 |
| 8,745,801 B2 * | 6/2014 | Prins ...................... | B63B 27/14 114/362 |
| 2010/0086362 A1 * | 4/2010 | Aubault .................. | B63B 35/44 405/195.1 |
| 2015/0252634 A1 * | 9/2015 | Golovinskij .......... | E21B 19/004 166/360 |

FOREIGN PATENT DOCUMENTS

| | | |
|---|---|---|
| WO | 02/101156 A1 | 12/2002 |
| WO | 2012/047096 A1 | 4/2012 |
| WO | 2012/163635 A1 | 12/2012 |

\* cited by examiner

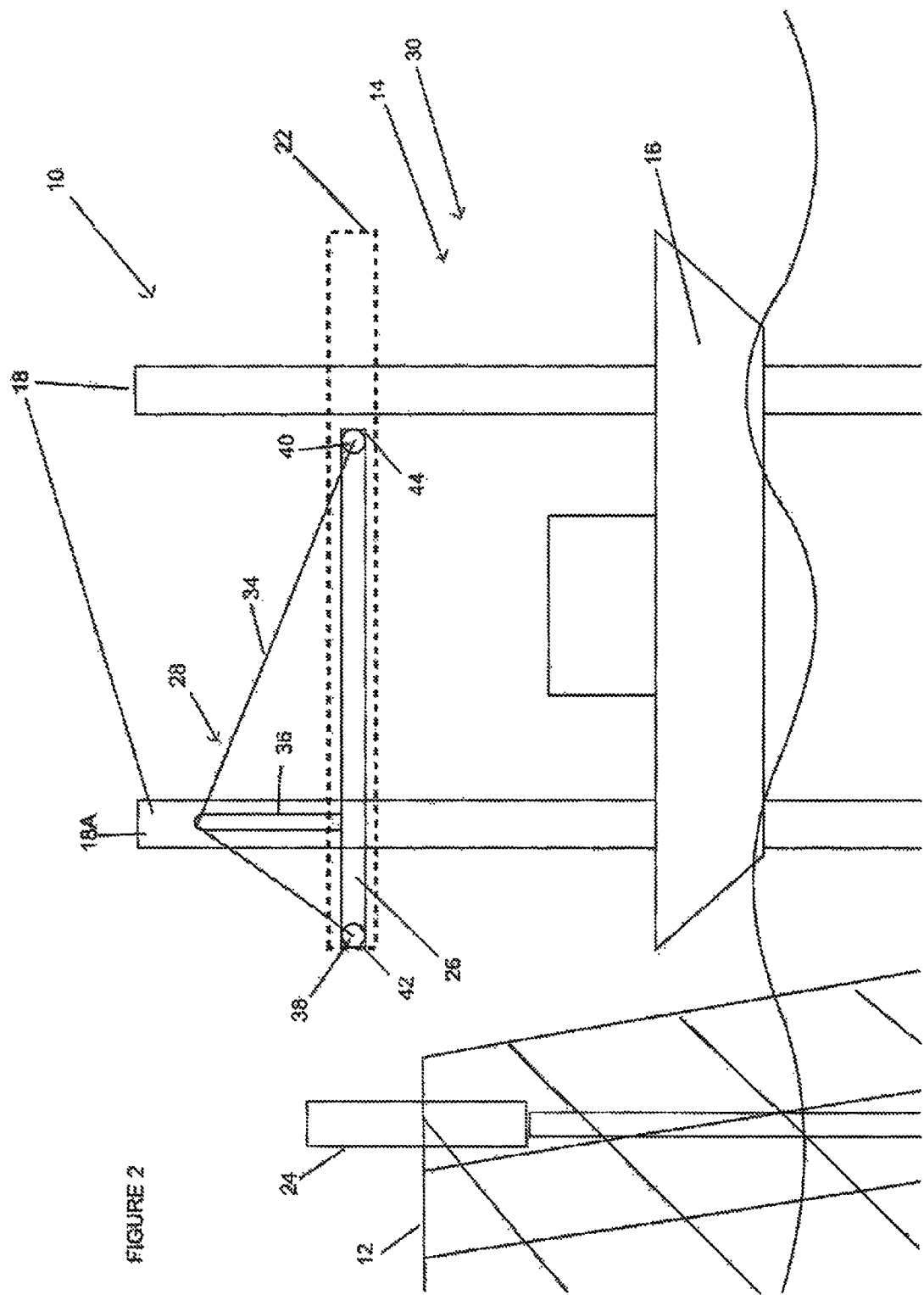

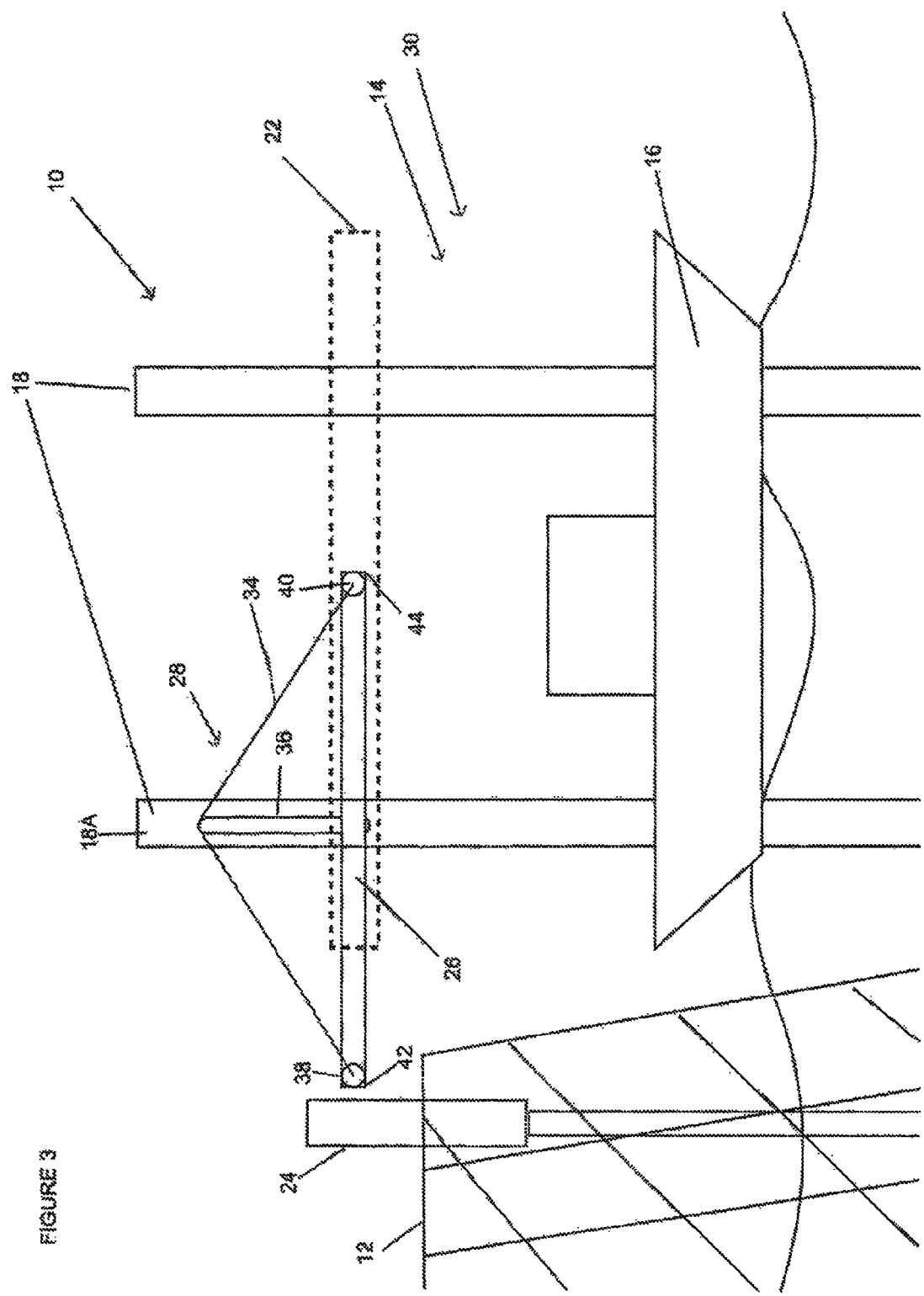

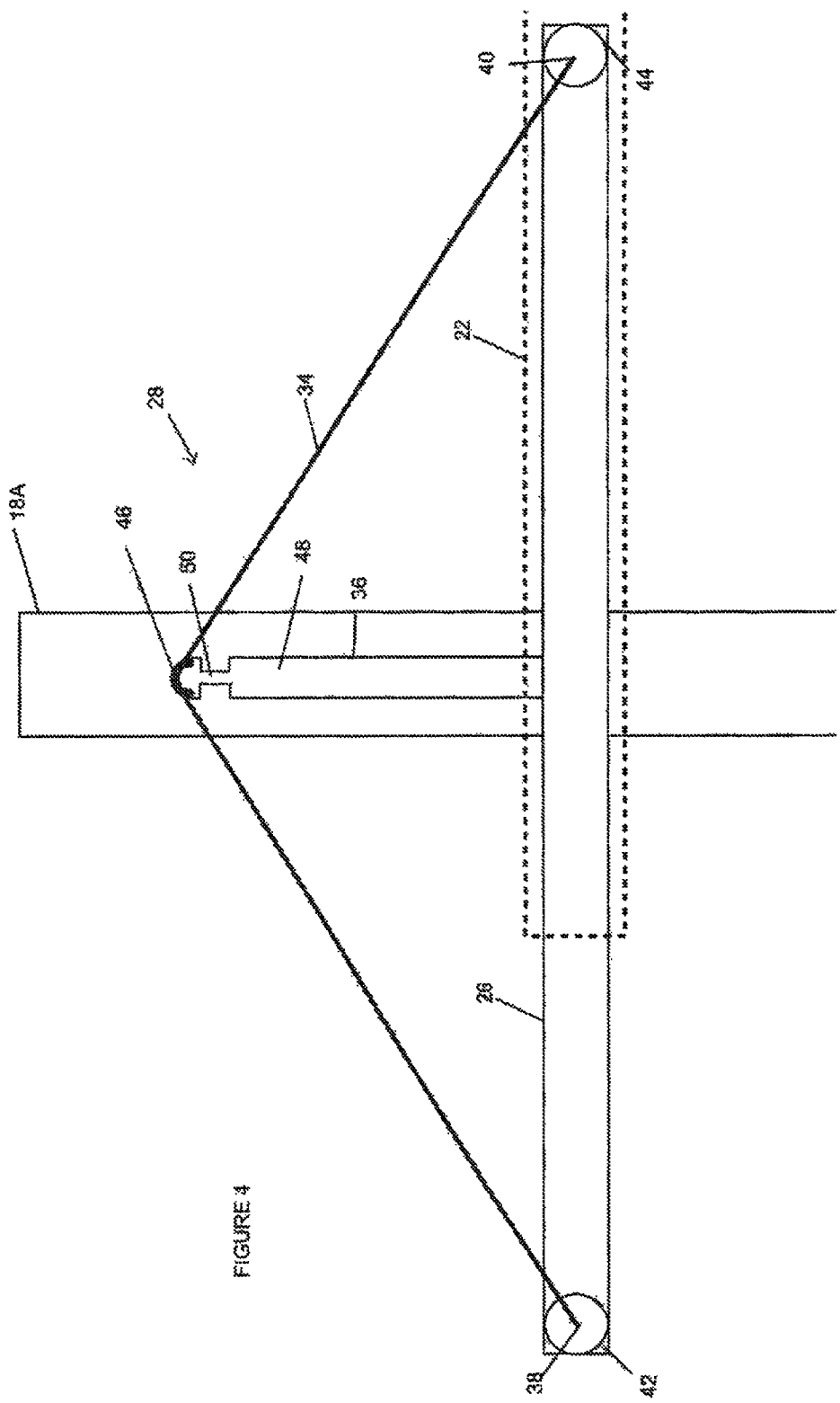

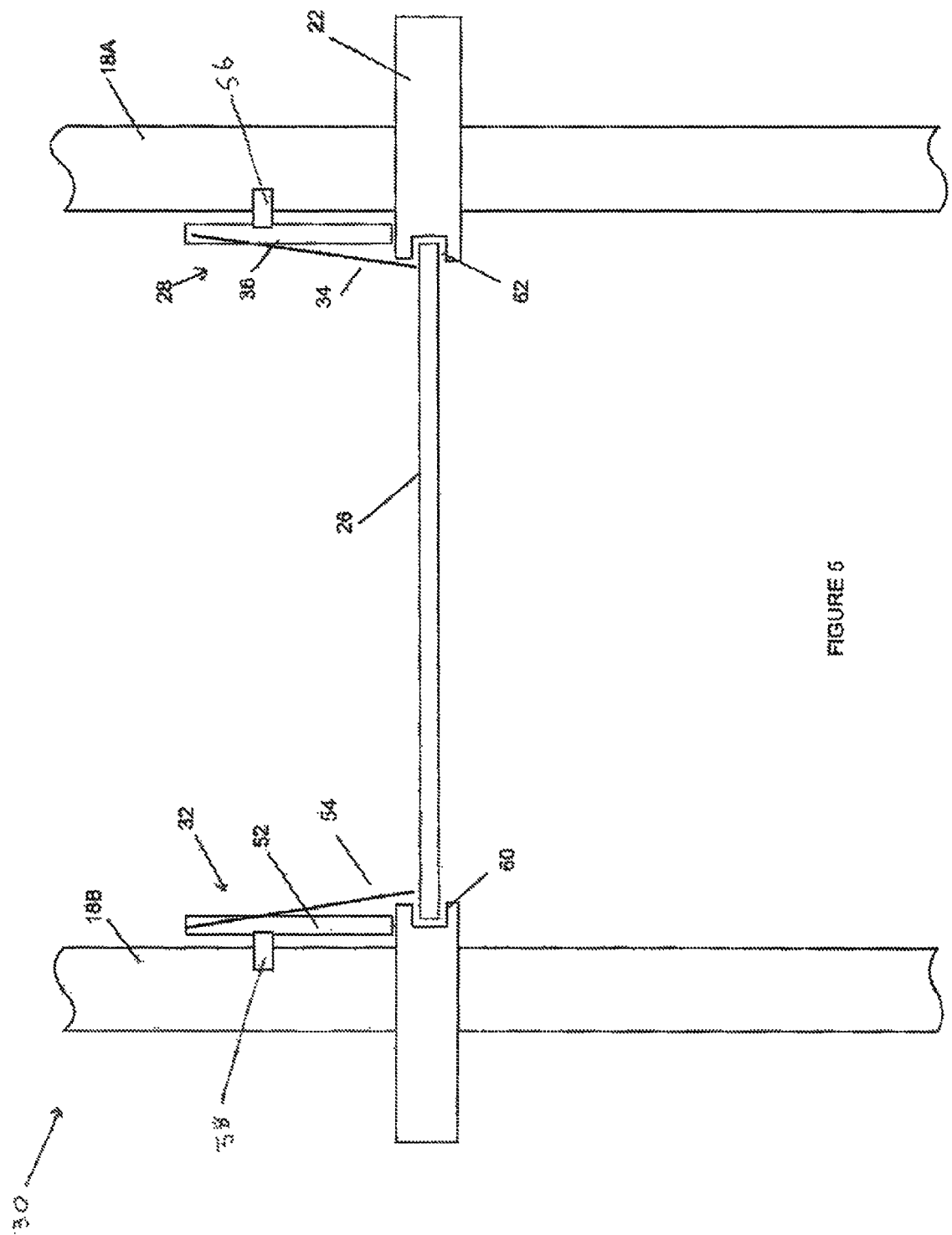

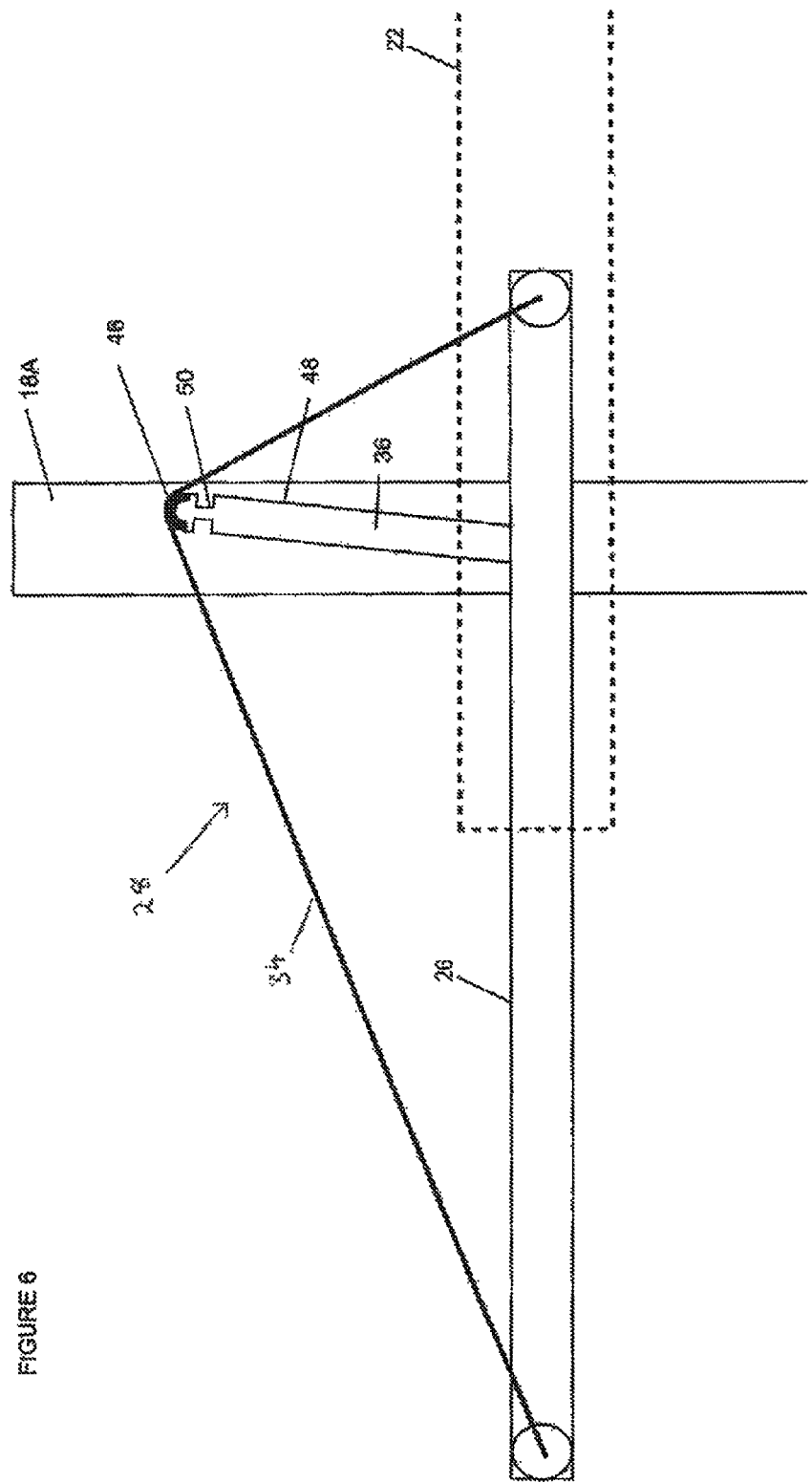

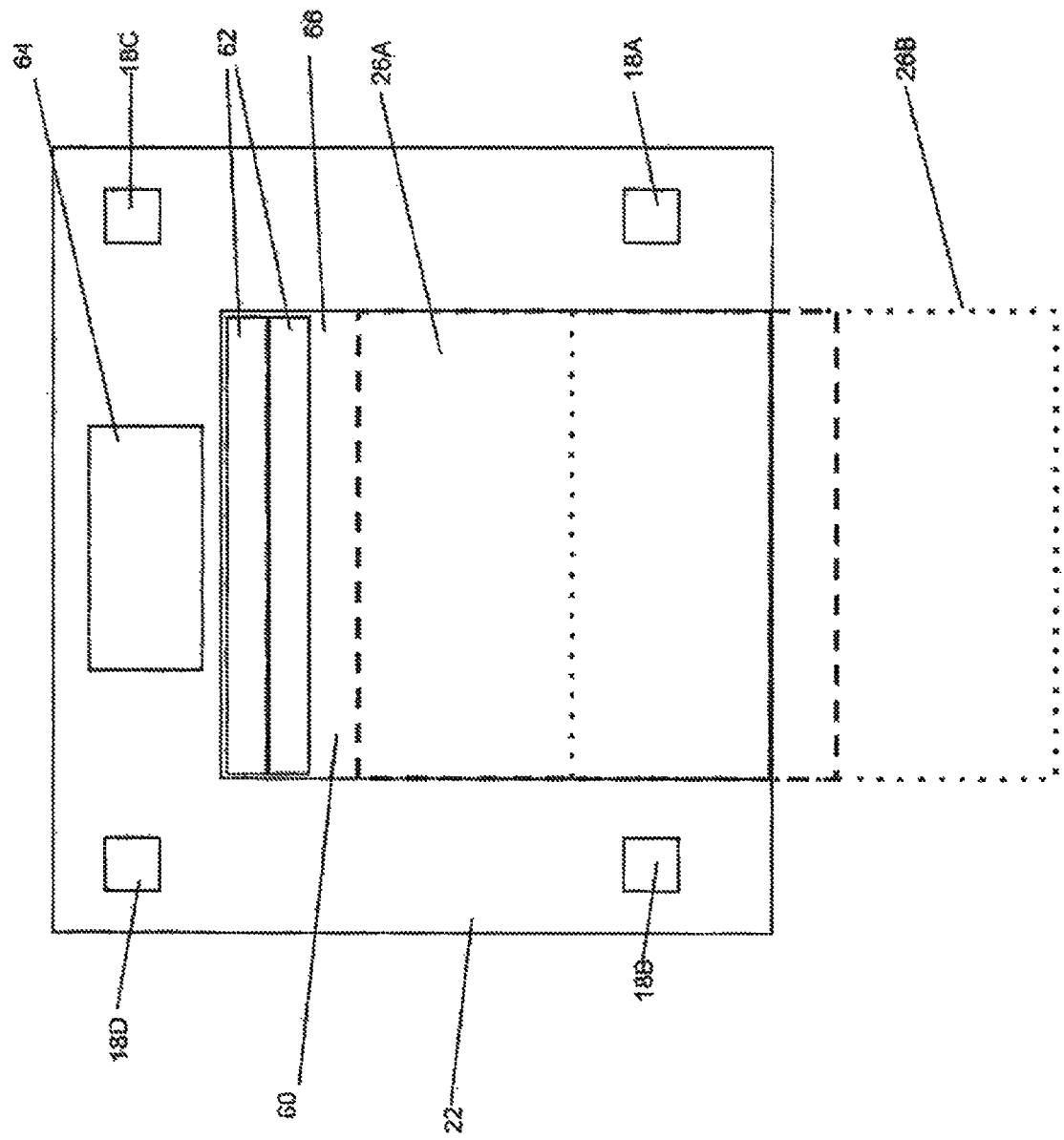

APPARATUS FOR PROVIDING ACCESS TO EQUIPMENT OR STRUCTURES THAT REQUIRE MAINTENANCE

FIELD OF THE INVENTION

The present invention relates to an apparatus for providing access to an object to be maintained. Particularly, but not exclusively, the present invention relates to an apparatus for providing access to an object to be maintained in an offshore environment.

BACKGROUND TO THE INVENTION

Obtaining access to offshore structures such as wind turbines and oil and gas installations, to undertake, for example, servicing, maintenance or abandonment operations can be extremely hazardous. Often the vessel front which the servicing, maintenance or abandonment operation is to be performed, draws up alongside the offshore structure and the engineer steps or jumps onto the structure or man rides off the vessel to work on the structure. In the case of maintenance of a wind turbine, for example, the maintenance engineer steps or jumps onto a vertical ladder on the wind turbine base. However, if a repair is required to, for example, the wind turbine blades, this often requires a vessel with cranes to be brought into position to lift replacement blades to the required height and for the maintenance engineers to be suspended in harnesses to perform functions for removal of the defective blades and installation the new blades.

Furthermore, the equipment necessary for providing the servicing, maintenance or abandonment operations may require to be lifted onto the offshore structure. The transfer of the equipment represents a risk to the structure, personnel and environment.

This problem is further exacerbated when it comes to older offshore structures, particularly oil and gas structures which due to a prolonged spell in the maritime environment can no longer support the weight of the servicing or maintenance equipment that has been traditionally lifted onto, landed and supported by the structure.

SUMMARY OF THE INVENTION

According to a first aspect of the present invention there is provided an apparatus for providing access to an object to be maintained, the apparatus comprising:
a deck:
an apparatus structure for supporting the deck;
a platform, the platform being movable with respect to the deck from a stowed position to an extended position, in the extended position the platform forming an extension to the deck;
a platform support mechanism comprising at least one cable and at least one compression post; the/each cable having a cable first end attach to the platform at or adjacent to a platform leading edge and a cable second end attached to the platform at or adjacent to a platform trailing edge, the/each compression post supporting the cable between the cable first end and the cable second end, the/each compression post being adapted to maintain substantially constant tension in one of said cables as the platform moves from the stowed position to the extended position.

In at least one embodiment of the present invention, providing an apparatus which incorporates a platform support mechanism as described above, permits the at least part of the weight of the platform to be transferred to the apparatus structure independently of the deck, creating an apparatus which can be extended into the proximity of an object to be maintained permitting safe working and an effective means of transferring components to the required location adjacent to the object being maintained. The apparatus described provides access and permits operations to be conducted on offshore structures without landing weights on the structure. An apparatus in accordance with the least one embodiment of the present invention provides an independently supported platform around and/or over the offshore structure, providing safe access for personnel and equipment without exerting any weight on the structure.

The/each compression post may be adapted to at least partially transfer the weight of the platform to the apparatus structure.

The deck and the platform may be integral.

The deck may be adapted to at least partially support the platform. The deck and the platform support mechanism may cooperate to transfer the whole weight of the platform to the support structure.

The deck may define a recess adapted to receive part of the platform.

The deck recess may comprise a first deck recess and a second deck recess, the first and second deck recesses adapted to receive a first platform side edge and a second platform side edge respectively.

In moving from the stowed position to the extended position, the platform may be adapted to slide within the first and second deck recesses.

The apparatus may further comprise a sliding mechanism adapted to facilitate movement of the platform with respect to the deck.

The sliding mechanism may comprise first and second low friction slides, one said low friction slides being located in or adjacent to each deck recess.

The sliding mechanism may comprise at least one Hillman roller.

The platform may be movable with respect to the compression post.

The/each compression post may be adapted to vary in length to maintain a substantially constant tension in the cable as the platform moves from the stowed position to the extended position.

The/each cable may be fixed in length. That is, the cable does not lengthen or shorten as the platform moves from the stowed position to the extended position.

The/each compression post may comprise a body and a cable support. The cable support may be adapted to engage and support the cable and maximise distribution of load in the cable.

The cable support may be movable with respect to the body to maintain and distribute a substantially constant tension in the cable.

The cable support may comprise a low friction interface for engaging the cable such that the cable can move with respect to the compression post with friction minimised.

The cable support may comprise a sheave for engaging the cable.

The sheave may be a rolling sheave.

The/each compression post may comprise a jack, the jack being adapted to move the cable support with respect to the post body.

The jack may be a hydraulic jack.

The/each compression post may extend or contract by movement of the cable support with respect to the compression post body to maintain a constant tension within the/each cable as the platform moves between the stowed and extended configurations.

The/each compression post may extend or contract automatically.

The jack may be adapted to extend or contract the compression post automatically to maintain the tension in the cable as the compression post moves with respect to the cable.

The/each compression post may be mounted to the deck.

The/each compression post may be movable with respect to the deck. In particular embodiments, the compression post may be movable to a position in which transfer of the weight of the platform to the apparatus structure is best facilitated.

The/each compression post may be adapted to tilt with respect to the deck.

The/each compression post and the deck may define an angle therebetween.

The/each compression post may be movable with respect to the deck such that the angle is variable. As the platform moves to the extended configuration, the compression post may tilt away from the platform leading edge to maintain a direct compression of the post by the cable.

The deck may be adapted to move with respect to the apparatus structure.

The apparatus structure may comprise one or more legs.

The/each compression post may be adapted to transfer the weight of the platform to at least one of said legs.

The/each compression post may further comprise a guide, the guide being adapted to engage with the apparatus structure.

The guide may be adapted to transfer the weight experienced by the compression post to which it is attached to the apparatus structure The cable first end may be attached to the platform at a first distance from the platform leading edge and the cable second end may be attached to the platform at a second distance from the platform trailing edge, the first distance and the second distance being the same.

In this embodiment, when the compression post is equally spaced from the cable first end and the cable second end, and the compression post is vertical, the platform is in balance.

The apparatus may be adapted to be used at sea.

The apparatus structure may be adapted to float.

The apparatus structure may comprise a hull.

The deck may be releasably attachable to the hull.

The deck may be adapted to move with respect to the hull.

The deck may be adapted to be elevated with respect to the hull to a working height.

The deck may be jacked up the legs, away from the hull. Such a arrangement permits the deck to be elevated with respect the hull to the working height to permit maintenance or servicing operations to be performed.

In alternative embodiments, the apparatus may be adapted to be used on land.

According to a second aspect of the present invention there is provided apparatus for providing access to an object to be maintained, the apparatus comprising:

a deck;

an apparatus structure for supporting the deck;

a platform, the platform being movable with respect to the deck from stowed position to an extended position, in the extended position the platform forming an extension to the deck;

a platform support mechanism adapted to at least partially transfer the weight of the platform in the extended position to the apparatus structure.

According to a third aspect of the present invention there is provided an apparatus for providing access to an object to be maintained, the apparatus comprising:

a platform;

an apparatus structure for supporting the platform, the platform being movable with respect to the apparatus structure from a stowed position to an extended position, in the extended position the platform forming an extension to the apparatus structure;

a platform support mechanism comprising at least one cable and at least one compression post; the cable having a cable first end attached to the platform at or adjacent a platform leading edge and a cable second end attached to the platform at or adjacent to a platform trailing edge, the compression post supporting the cable between the cable first end and the cable second end, the compression post being adapted to maintain substantially constant tension in the cable as the platform moves from the stowed position to the extended position.

According to a fourth aspect of the present invention there is provided an apparatus for providing access to an object to be maintained, the apparatus comprising:

a deck;

an apparatus structure for supporting the deck;

a platform, the platform being movable with respect to the deck from a stowed position to an extended position, in the extended position the platform forming an extension to the deck;

wherein the weight of the platform is transferred to the apparatus structure through the deck and through a platform support mechanism attached to the apparatus structure.

It will be understood that features listed as preferred respect to the first embodiment may be equally applicable to subsequent embodiments and are not repeated for brevity.

BRIEF DESCRIPTION OF THE DRAWINGS

An embodiment of the present invention will now be described with reference to the accompanying drawings in which:

FIG. 2 is a schematic side view of the apparatus of FIG. 1 with the deck in an elevated position and the platform in a stowed position;

FIG. 3 is a schematic side view of the apparatus of FIG. 1 with the platform in a partially extended position;

FIG. 4 is a schematic side view of the first platform support mechanism of the apparatus of FIG. 1 in the partially extended position;

FIG. 5 is a schematic end view of the deck, platform and the first and second platform support mechanisms of the apparatus of FIG. 1;

FIG. 6 is schematic side view of the first platform support mechanism of the apparatus of FIG. 1 in the fully extended position; and FIG. 7 is a schematic top view of part of the apparatus of FIG. 1.

DETAILED DESCRIPTION OF THE DRAWINGS

Figure 1:
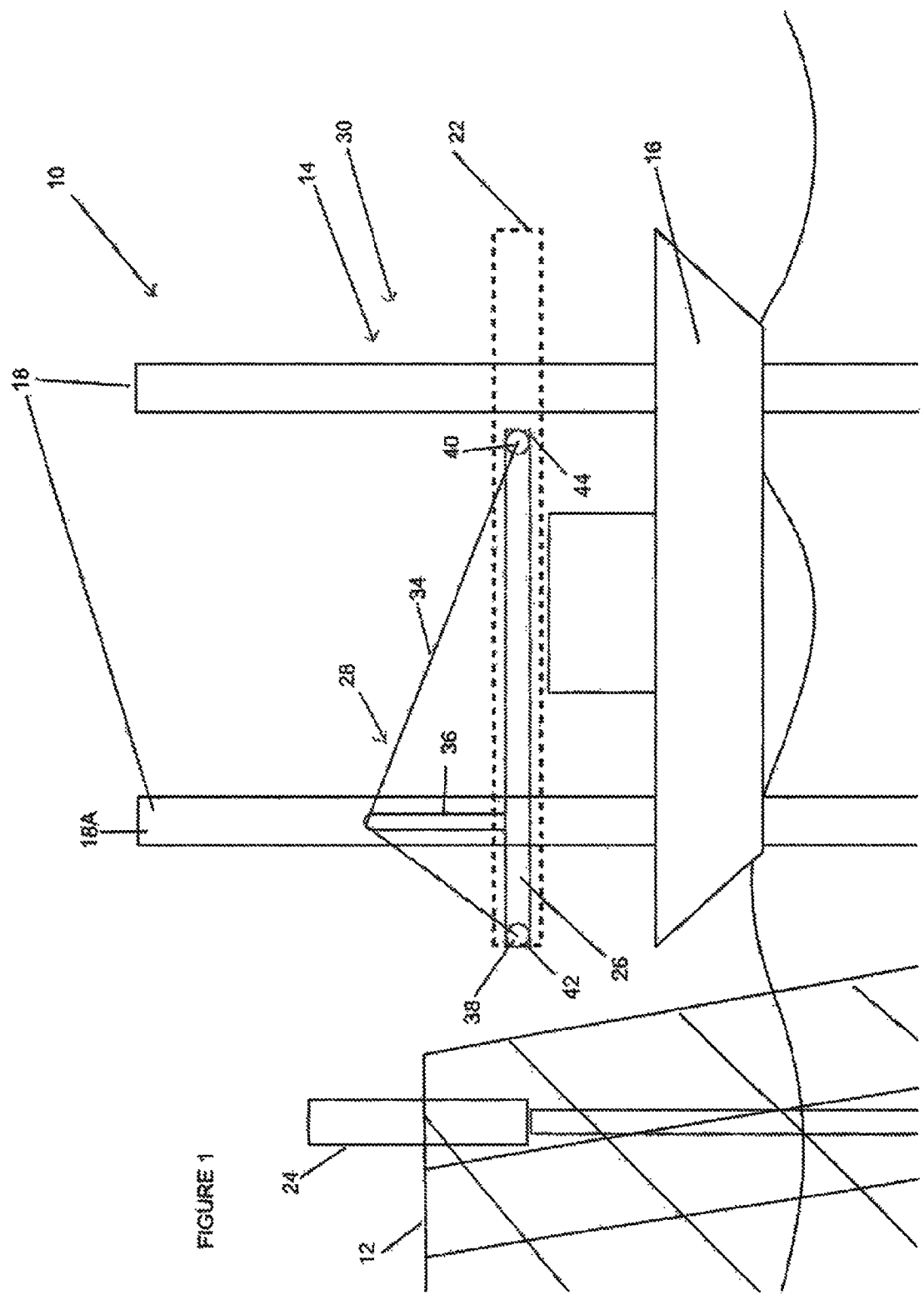
FIG. 1 is a schematic side view of an apparatus for providing access an object to be maintained with a platform in a stowed position, according to an embodiment of the present invention.

Reference is first made to FIG. 1, a schematic side view of an apparatus, generally indicated by reference numeral 10, for providing access to an object to be serviced, maintained or abandoned, in this case an offshore structure 12 incorporating a wellhead 24, in accordance with an embodiment of the present invention.

The apparatus 10 is a jack-up vessel 14 comprising a deck 22 (shown in broken outline) and an apparatus structure 30, the apparatus structure 30 comprising a hull 16 and four legs 18. In operation, the legs 18 are generally resting on the sea bed.

The deck 22 is normally attached to the hull 16, however in order to perform maintenance operations at elevated heights, the deck 22 can be detached from the hull 16 and moved to an elevated position adjacent to the wellhead 24, shown in FIG. 2. The deck 22 is elevated by travelling up the legs 18 from the level of the hull 16 (shown in FIG. 1) to the elevated position adjacent the wellhead 24 (shown in FIG. 2). The provision of an elevated deck 22 allows the operators to be raised to the level of the wellhead 24 and permits machinery and replacement parts, for example, to be positioned adjacent the wellhead. Reference is made to International Patent Publication WO 2012/163635, the contents of which are incorporated by reference.

As can be seen from FIG. 2, however, there is still a substantial gap between the elevated deck 22 and the wellhead 24. To bridge this gap, the vessel 14 is provided with a platform 26, the platform 26 being movable in a plane parallel to the plane of the deck 22 using hydraulic rams (not shown) from a stowed position, shown in FIG. 2 to a partially extended position, shown in FIG. 3; a schematic side view of the apparatus 10 of FIG. 2 with the platform 26 in a partially extended position and, ultimately, to a fully extended position shown and discussed in due course in connection with FIG. 5.

As can be seen from FIG. 3, the platform 26 is extended into the proximity of the wellhead 24 allowing safe access to the wellhead 24 for servicing, maintenance or abandonment. Once the wellhead 24 is accessible from the platform 26 machinery, tools and equipment resting on the platform 26 can be moved, located or erected on or over the offshore structure 12 or wellhead 24, facilitating the maintenance, servicing or abandonment task without the need for placing weight on the offshore structure or with a reduced need of operations such as manriding.

Referring to FIG. 2 and FIG. 3, the apparatus 10 further includes a first platform support mechanism 28 and a second platform support mechanism 32 (shown and discussed in connection with FIG. 5) for transferring the weight of the platform 26 to the apparatus structure 30. The first and second platform support mechanisms 28, 32 are located on either side of the platform 26.

Taking the first platform support mechanism 28 as exemplary of both mechanisms 28, 32, the mechanism 28 comprises a cable 34 and a compression post 36. The cable 34 has a first end 38 attached to a platform leading edge 42 and a second end 40 attached to a platform trailing edge 44. This arrangement means that the cable 34 travels with the platform 26 as it moves between the stowed and extended positions.

During this travel, tension is maintained in the cable 34 by a compression post 36. The compression post 36 at least partially transfers the weight of the platform 26, via the cable 34 to the front left leg 18A of the apparatus structure 30.

The compression post 36 can be more clearly seen in FIG. 4; a schematic side view of the first platform support mechanism 28 of the apparatus 10 of FIG. 1. The compression post 36 comprises a running sheave 46 connected to a post body 48 by a hydraulic jack 50. The running sheave 46 is adapted to provide a substantially frictionless retainer for the cable 34 to run through. The hydraulic jack 50 is provided to increase and decrease the length oaf the compression post 36 as the platform 26 moves between the stowed and extended positions. The change in length of the compression post 36 is required to maintain a constant tension in the cable 34 by taking up any "slack" or releasing over tension caused by "stretching" of the cable 34 as the platform 26 moves.

Reference is now made to FIG. 5; a schematic end view of the deck 22, platform 26 and the first and second platform support mechanisms 28, 32 of the apparatus 10 of FIG. 1.

The second platform support mechanism 32 is visible in this Figure, the second platform support mechanism 32 comprising a second compression post 52 and a second cable 54.

Also visible on this Figure are the attachment mechanisms 56, 58 which the first and second compression posts 36, 52 use to transfer the weight of the platform 26 to the apparatus structure 30 and the first and second apparatus structure legs 18A, 18B in particular.

The support mechanisms 28, 32 are not the sole method of supporting the weight of the platform 26. As can also be seen from FIG. 5, the platform 26 is located within recesses 60, 62 defined by the deck 22. These recesses incorporate low friction slides (not shown) which assist in supporting the weight of the platform 26. In particular, the low friction slides are Hillman rollers, mounted above and below the platform 26 to sandwich each edge of the platform 26.

In the partially extended state shown in FIG. 4, the weight of the platform 26 is mostly taken by the deck 22. In this position, the compression post 36 is midway between the platform leading edge 42 and the platform trailing edge 44 and compression post 26 bisects the cable 34. The compression post 36 acts as a fulcrum and transfers the unsupported weight of the platform 26 to the vessel leg 18A. As the compression post 36 bisects the cable 34, the platform 26 is balanced about the compression post 36 when the compression post 36 is in a vertical position and the hydraulic jack takes up any slack in the cable 34 to ensure direct compression of the post 36 by the cable 34.

Reference is now made to FIG. 6, a schematic side view of the first platform support mechanism 28 of the apparatus 10 of FIG. 1 in the fully extended position.

In some embodiments, it may be necessary to extend the platform 26 to its maximum extent, shown in FIG. 6. In this position, much more of the weight of the platform 26 is taken by the platform support mechanism 28. As can be seen from FIG. 6, the compression post 36 does not move with the platform to keep the platform 26 in balance about the compression post 36 and to ensure direct compression of the post 36 by the cable 34, the post 36 is adapted to tilt with respect to the deck 22 and the platform 26 such that the platform is balanced between them. During this process, the change in angle with respect to the deck 22 of the cable 34 means that the compression post 36 must be shortened by retracting the hydraulic jack 50.

Finally, reference is made to FIG. 7, a schematic top view of part of the apparatus of FIG. 1. In this Figure, the deck 22 is shown along with the four supporting legs 18A-18D. Also visible as the platform 26 shown in dashed outline in the partially extended position 26A and in dotted outline in the fully extended position 26B. The deck 22 defines and aperture 60 which the platform 26 fully occupies in the stowed configuration. As the platform 26 moves from the stowed to the fully extended configuration, the aperture 60 opens up revealing a void 66. This void 66 is filled with panels 62, of which two are shown, the panels 62 unfolding automatically to fill the void 66. This assist in overcoming the safety hazard of an opening on the deck 22.

However, in certain circumstances, an opening on the deck would be useful for lowering or raising equipment, tools or parts for a servicing or maintenance operation from the hull 16 up to the deck 22 for subsequent positioning on the platform 26 to allow the equipment, tools or parts to be positioned adjacent the worksite.

In this embodiment, an opening 64 in the deck 22, known as a moonpool is provided for this purpose. A crane (not shown) mounted to the deck 22 can be utilised to raise and lower tools and equipment through the moonpool 64 between the deck 22 or platform 26 and the hull 16 below.

Various modifications and improvements may be made to the above described embodiment without departing from the scope of the invention. For example, although the offshore structure 12 is described as an oil and gas platform, will be understood that the apparatus 10 can be used to perform maintenance, servicing or abandonment operations on any offshore structure including but not limited to renewable energy generation equipment such as wind turbines.

Additionally, the provision of the void 66 and the moonpool 64 allows for operations to be performed beneath the surface of the water adjacent or below the apparatus, such as repairs or maintenance of subsea wellheads or subsea manifolds in water depths at which the legs 18 can engage the seabed.

The invention claimed is:

1. An apparatus for providing access to an object to be maintained, the apparatus comprising:
   a deck;
   an apparatus structure for supporting the deck;
   a platform, the platform being movable with respect to the deck from a stowed position to an extended position, in the extended position the platform forming an extension to the deck; and
   a platform support mechanism comprising at least one cable and at least one compression post; the/each cable having a cable first end attached to the platform at or adjacent to a platform leading edge and a cable second end attached to the platform at or adjacent to a platform trailing edge, the/each compression post supporting the cable between the cable first end and the cable second end, the/each compression post being adapted to maintain substantially constant tension in one of said cables as the platform moves from the stowed position to the extended position,
   wherein the/each compression post is adapted to vary in length to maintain a substantially constant tension in the cable as the platform moves from the stowed position to the extended position.

2. An apparatus according to claim 1 wherein the/each compression post is adapted to at least partially transfer the weight of the platform to the apparatus structure.

3. An apparatus according to claim 1, wherein the deck and the platform support mechanism cooperate to transfer the whole weight of the platform to the apparatus structure.

4. An apparatus according to claim 1, wherein the deck defines a recess adapted to receive a part of the platform, the deck recess comprising a first deck recess and a second deck recess, the first and second deck recesses being adapted to receive a first platform side edge and a second platform side edge respectively.

5. An apparatus according to claim 4 wherein in moving from the stowed position to the extended position, the platform is adapted to slide within the first and second deck recesses.

6. An apparatus according to claim 1, wherein the platform is movable with respect to the/each compression post.

7. An apparatus according to claim 1, wherein the/each cable is fixed in length.

8. An apparatus according to claim 1, wherein the/each compression post comprises a body and a cable support.

9. An apparatus according to claim 8 wherein the cable support is adapted to engage and support the cable and maximise distribution of load in the cable, the cable support being movable with respect to the body to maintain and distribute a substantially constant tension in the cable.

10. An apparatus according to claim 8 wherein the/each compression post extends or contracts by movement of the cable support with respect to the compression post body to maintain a constant tension within the/each cable as the platform moves between the stowed and extended configurations.

11. An apparatus according to claim 1, wherein the/each compression post is mounted to the deck and is movable with respect to the deck.

12. An apparatus according to claim 1, wherein the/each compression post and the deck define an angle therebetween, the/each compression post being movable with respect to the deck such that the angle is variable.

13. An apparatus according to claim 1, wherein, as the platform moves to the extended configuration, the compression post tilts away from the platform leading edge to maintain a direct compression of the compression post by the cable.

14. An apparatus according to claim 1, wherein the deck is adapted to move with respect to the apparatus structure.

15. An apparatus according to claim 1, wherein the apparatus structure comprises one or more legs, the/each compression post being adapted to transfer the weight of the platform to at least one of said legs.

16. An apparatus according to claim 1, wherein the cable first end is attached to the platform at a first distance from the platform leading edge and the cable second end is attached to the platform at a second distance from the platform trailing edge, the first distance and the second distance being the same.

17. An apparatus for providing access to an object to be maintained, the apparatus comprising:
   a deck;
   an apparatus structure for supporting the deck;
   a platform, the platform being movable with respect to the deck from a stowed position to an extended position, in the extended position the platform forming an extension to the deck; and
   a platform support mechanism comprising at least one cable and at least one compression post; the/each cable having a cable first end attached to the platform at or adjacent to a platform leading edge and a cable second end attached to the platform at or adjacent to a platform trailing edge, the/each compression post supporting the cable between the cable first end and the cable second end, the/each compression post being adapted to maintain substantially constant tension in one of said cables as the platform moves from the stowed position to the extended position,
   wherein the deck defines a deck recess adapted to receive a part of the platform, the deck recess comprising a first deck recess and a second deck recess, the first and second deck recesses being adapted to receive a first platform side edge and a second platform side edge respectively.

18. An apparatus for providing access to an object to be maintained, the apparatus comprising:
a deck;
an apparatus structure for supporting the deck;
a platform, the platform being movable with respect to the deck from a stowed position to an extended position, in the extended position the platform forming an extension to the deck; and
a platform support mechanism comprising at least one cable and at least one compression post; the/each cable having a cable first end attached to the platform at or adjacent to a platform leading edge and a cable second end attached to the platform at or adjacent to a platform trailing edge, the/each compression post supporting the cable between the cable first end and the cable second end, the/each compression post being adapted to maintain substantially constant tension in one of said cables as the platform moves from the stowed position to the extended position,
wherein the/each compression post and the deck define an angle therebetween, the/each compression post being movable with respect to the deck such that the angle is variable.

* * * * *